No. 749,728. PATENTED JAN. 19, 1904.
J. C. W. GRETH.
WATER PURIFYING APPARATUS.
APPLICATION FILED JUNE 13, 1903.
NO MODEL. 3 SHEETS—SHEET 1.
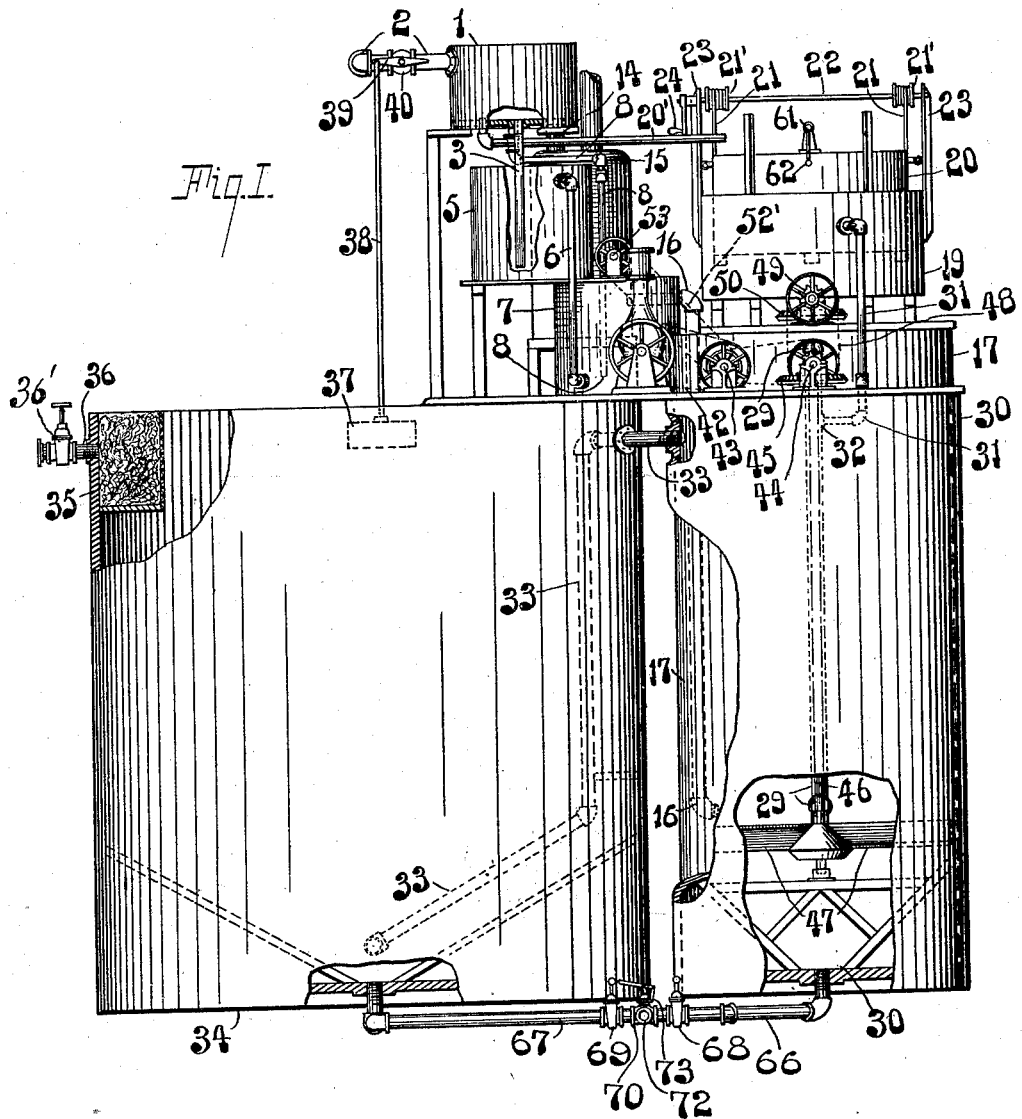
Fig. I.
WITNESSES:
Geo. H. Harvey.
F. N. Barber.
INVENTOR,
J. C. W. Greth,
by his Attorney Wm. L. Pierce No. 749,728. PATENTED JAN. 19, 1904.
J. C. W. GRETH.
WATER PURIFYING APPARATUS.
APPLICATION FILED JUNE 13, 1903.
NO MODEL. 3 SHEETS—SHEET 2.
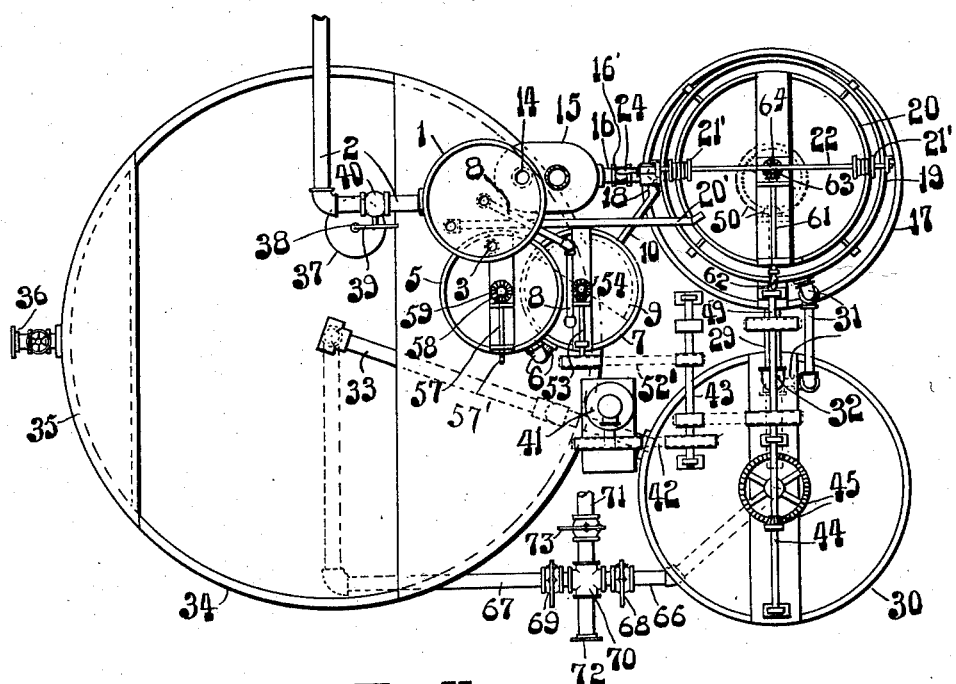
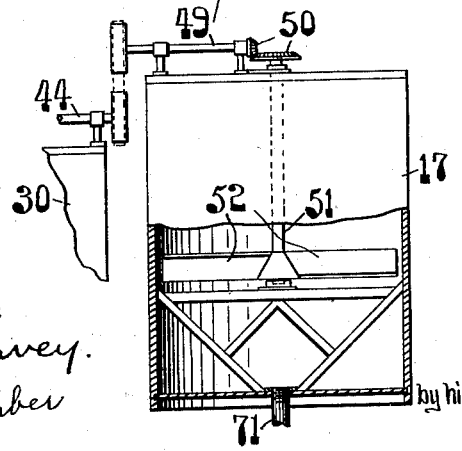
WITNESSES:
Geo. H. Harvey.
F. N. Barber.
INVENTOR,
J. C. W. Greth,
by his Attorney Wm. L. Pierce.

No. 749,728. PATENTED JAN. 19, 1904.
J. C. W. GRETH.
WATER PURIFYING APPARATUS.
APPLICATION FILED JUNE 13, 1903.
NO MODEL. 3 SHEETS—SHEET 3.
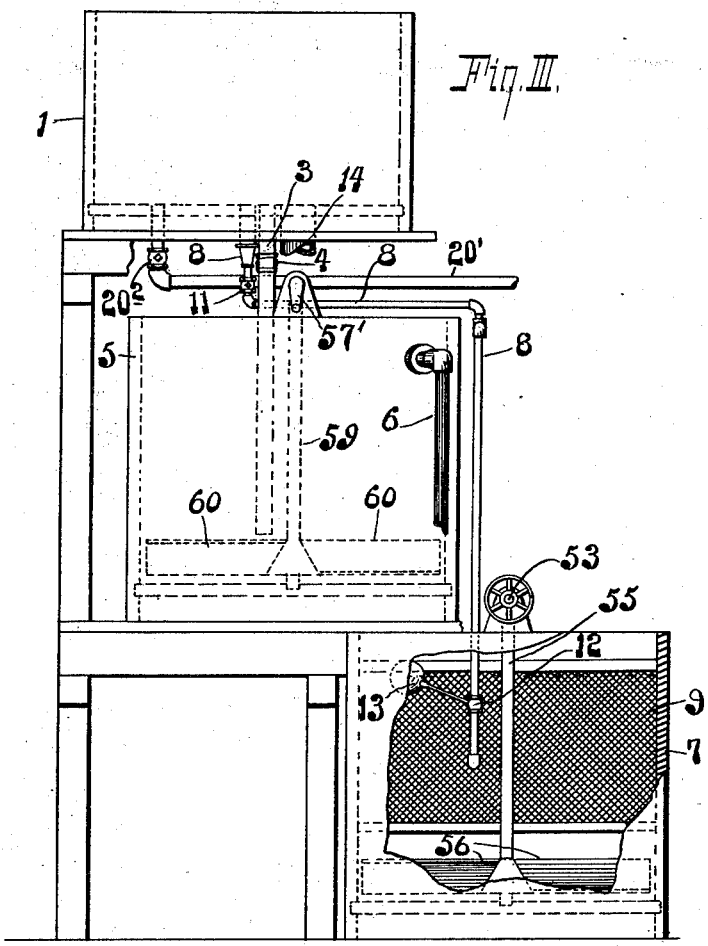
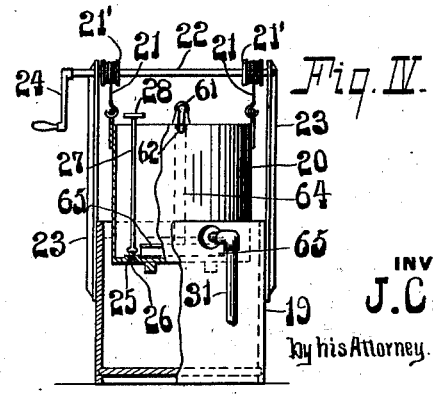
WITNESSES:
Geo. H. Harvey.
F. N. Barber
INVENTOR,
J. C. W. Greth,
by his Attorney Wm. L. Pierce.

No. 749,728.

Patented January 19, 1904.

UNITED STATES PATENT OFFICE.

JOHN C. WM. GRETH, OF PITTSBURG, PENNSYLVANIA, ASSIGNOR TO WM. B. SCAIFE & SONS COMPANY, OF PITTSBURG, PENNSYLVANIA, A CORPORATION OF NEW JERSEY.

WATER-PURIFYING APPARATUS.

SPECIFICATION forming part of Letters Patent No. 749,728, dated January 19, 1904.

Application filed June 13, 1903. Serial No. 161,268. (No model.)

*To all whom it may concern:*

Be it known that I, JOHN C. WM. GRETH, a citizen of the United States, residing at Pittsburg, in the county of Allegheny and State of Pennsylvania, have invented or discovered new and useful Improvements in Water-Purifying Apparatus, of which the following is a specification.

My invention relates to apparatus for purifying water, and has for its object the thorough mixing of different chemicals with water in succession, so that each chemical may act on the impurities without the disturbing presence of another chemical treatment.

In the accompanying drawings, which make part of this specification, Figure I is a side elevation, parts being broken away, showing my invention; Fig. II, a plan view thereof; Fig. III, an end elevation of the distributing, slaking, and lime-solution tanks with their connections, the latter tank being broken away to show the mechanism within; Fig. IV, a broken-away elevation of the soda-tank and the float therein; Fig. V, a fragmentary view, partly in section and partly in elevation, showing the chemical-tank 17 and the stirring device therefor.

1 represents the water-distributing tank, to which water is supplied by the inlet-pipe 2 and which has the vertical outlet-pipe 3, provided with the regulating-valve 4. The pipe 3 discharges into the slaking-tank 5, and preferably near the bottom thereof. From near the top of the slaking-tank a pipe 6 extends downwardly and enters the lime-solution tank 7 near its bottom.

A pipe 8 is connected to the distributing-tank 1 and discharges water into the lime-solution tank 7 near its bottom. The latter tank has a filter 9 on one side, through which liquids in this tank pass on their way therefrom to the discharge-pipe 10. The pipe 8 has the controlling-valve 11 and a valve 12, regulated by the float 13, in the tank 7.

The tank 1 is connected by the pipe 14 to the water-heater 15, which discharges the water by the pipe 16 into the chemical-tank 17, near the bottom thereof. The discharge-pipe 10 empties into the pipe 16 at the point 18. The pipe 16 has a regulating-valve 16'.

Above the tank 17 is the soda-tank 19, in which is the floating regulating-tank 20. The latter tank can be raised by the cords 21, secured to pulleys 21' on the shaft 22, supported in bearings in the standards 23, fastened to the tank 19. The shaft 22 is operated by the handle 24. The pipe 20', having the valve $20^2$, delivers water from tank 1 into the floating tank 20. The tank 20 has in its bottom a discharge-opening 25, normally closed by the screw-plug 26, operated by the stem 27, connected thereto. The stem is provided with the hand-wheel 28.

The fluid in the chemical-tank 17 flows out near the top thereof through the pipe 29, which discharges into the mixing-tank 30 near its bottom, and the fluid in the soda-tank flows out near its top through the pipe 31, which joins the pipe 29 at the point 32. The mixed fluids in the tank 30 are discharged near its top through the pipe 33, which enters the settling-tank 34, near the bottom thereof.

The settling-tank 34 has an excelsior filter 35 on one side near its top. From this filter the service or outlet pipe 36 conveys the purified water to a suitable place for use or storage.

In the tank 34 is a float 37, having a stem 38, connected to the arm 39 of the valve 40 in the inlet-pipe 2.

41 represents an engine as a whole, which transmits motion by the belt 42 to the shaft 43, transmitting motion to the shaft 44, supported on the tank 30. The shaft 44 through bevel-gearing 45 rotates the vertical shaft 46, which carries at its lower end the paddles or stirrers 47, consisting of flat arms secured to the shaft, so as to let their planes cut the shaft at the angle of forty-five degrees, as shown on Fig. I. The shaft 44 through the belt 48 drives the shaft 49, which in turn through the bevel-gearing 50 rotates the shaft 51, carrying the stirring-arms 52 in the tank 17. The shaft 43 by means of belt 52' drives the shaft 53, mounted on the tank 7, and through bevel-gearing 54 drives the shaft 55, carrying stirring-arms 56 in the tank 7. A shaft 57, mounted on the tank 5 and operated by the handle 57', drives by means of the bevel-gearing 58 the shaft 59, carrying stirring-arms 60 in the tank 5.

Mounted on the floating tank 20 is the shaft 61, operated by the handle 62. This shaft by means of the bevel-gears 63 drives the shaft 64, on which are supported the stirring-blades 65.

The operation is as follows: Unpurified water is delivered by pipe 2 into the distributing-tank 1, whence a regulated portion of the water is delivered through pipe 3 into the slaking-tank 5, where the lime is slaked and mixed with water by means of the stirring-blades 60. The mixture passes through pipe 6 into the lime-solution tank 7, where it is reduced to the proper strength by a regulated stream of water delivered through the pipe 8 from the distributing-tank 1. The lime solution is thoroughly mixed by the paddles 56 and then passes through the filter 9 and out by pipe 10. Another regulated stream of water passes from the tank 1 by way of pipe 14, heater 15, and pipe 16 and empties into the chemical-tank 17, the pipe 10 discharging lime-water into the pipe 16 at the point 18, so that the water delivered into the tank 17 will be well mixed with the lime solution. Supposing the soda-solution tank 19 to be nearly filled with a solution of soda, the floating soda-tank 20 is supplied with soda and a regulated stream of water is admitted thereinto by pipe 20'. This causes the float to gradually settle, and the descent of the float displaces the soda solution in the tank 19, the solution flowing out through the pipe 31. The soda is mixed with the water in the floating tank by means of the blades 65. When the tank 20 has reached the bottom of the tank 19, the screw-plug 26 is removed and the tank 20 raised by the handle 24. As the tank 20 rises the soda solution therein is discharged into the tank 19 through the hole 25. When the tank 20 has been raised, the plug 26 is again screwed into the hole 25 and it is then ready for a repetition of its operation, as described. The water in the chemical-tank 17 flows out through pipe 29 into the mixing-tank 30; but before the pipe 29 discharges in the tank 30 it receives at the point 32 the soda solution discharged through the pipe 31. The mixed lime and soda solutions are thoroughly mixed by the blades 47, which, like the blades 56, so rotate as to throw the liquid upwardly. As shown on Figs. I and III, the right-hand blades would come toward the observer. From the mixing-tank 30 the liquid passes through the pipe 33 into the settling-tank 34, whence it is drawn off through the filter 35 and pipe 36, having the stop-valve 36'. When the settling-tank reaches a maximum level, the float 37 causes the valve 40 to close, thereby stopping the operation of the apparatus until some of the purified water escapes from the tank 34. Thus I have provided a water-purifier in which the chemicals are each thoroughly mixed with water before being mixed together, so that the action of the chemicals will take place readily and throughout every portion of the fluids. I have provided mechanical devices for mixing the chemical to make the chemical action complete. I have provided a system which is automatic in nearly every part, and therefore requires but few operators to keep it in operation.

In order to carry off the solid matter left behind in the tanks 30 and 34 or water by which they may be washed, I have provided the following: The pipe 66 is connected to the bottom of the tank 30 and the pipe 67 to the bottom of the tank 34. These pipes have the valves 68 and 69, respectively, and are secured to the pipe connection 70, which has the outlet 71, and may have other pipes, as 72, connected to the other tanks. Pipe 72 has a valve 73. I recommend that the pipe 72 be connected to the tank 17; but it may be connected to one of the other tanks, or additional pipes may be provided for the several tanks, if desired.

The chemicals named above may be changed to suit the water to be treated. In some instances some of the chemicals may be omitted, and in some entirely different chemicals may be used. It may become desirable in some cases to use the soda-tanks for the lime and the lime-tanks for the soda.

The heater may be omitted when it is found unnecessary to heat the water.

The lime passes out of tank 5 as cream of lime, and a saturated solution of lime is formed in tank 7. This is desirable, since the strength of the solution is always the same, and its effect on the water in tank 17 can be known in advance when the chemical character of the water treated is known.

Having described my invention, what I claim is—

1. In a water-purifying apparatus, a tank to contain a chemical solution, a floating tank therein in which the solution is preliminarily mixed with water, a valve in the floating tank, means to raise the latter, and means for operating the valve, the construction being such that when the valve is unseated and the floating tank is rising, the liquid therein will be discharged into the first-named tank.

2. In a water-purifying apparatus, a water-distributing tank, a lime-slaking tank, a lime-solution tank, a chemical-tank, and a floating tank, each connected to the first-named tank so as to receive water therefrom, means for conducting the cream of lime from the slaking-tank to the lime-solution tank and the saturated solution of lime from the latter tank to the chemical-tank, a soda-solution tank in which the floating tank sits, a mixing-tank, means for conducting the lime-and-soda-treated water into the mixing-tank, and a settling-tank connected to the latter tank.

Signed at Pittsburg, Pennsylvania, this 6th day of June, 1903.

J. C. WM. GRETH.

Witnesses:
   A. M. STEEN,
   F. N. BARBER.